US008925178B2

(12) United States Patent
Smith et al.

(10) Patent No.: US 8,925,178 B2
(45) Date of Patent: Jan. 6, 2015

(54) TWO GUN TOOL DOLLY FOR FIRING AND INSERTING THREE OR MORE NAILS INTO PLATE, HEADER, OR FOOTER FRAME MEMBERS BEING ATTACHED TO WALL STUD MEMBERS

(75) Inventors: Aubrey Smith, Cordova, TN (US); Stephen Fleming, Southaven, MS (US); Robert Tucker, Memphis, TN (US); Douglas Dodd, Hernando, MS (US)

(73) Assignee: Illinois Tool Works Inc., Glenview, IL (US)

( * ) Notice: Subject to any disclaimer, the term of this patent is extended or adjusted under 35 U.S.C. 154(b) by 842 days.

(21) Appl. No.: 12/285,160

(22) Filed: Sep. 30, 2008

(65) Prior Publication Data

US 2009/0100663 A1 Apr. 23, 2009

Related U.S. Application Data

(60) Provisional application No. 60/960,526, filed on Oct. 2, 2007.

(51) Int. Cl.
*B27F 7/02* (2006.01)
*B23P 11/00* (2006.01)

(52) U.S. Cl.
CPC ........................................ *B27F 7/02* (2013.01)
USPC ........ 29/525.01; 227/110; 227/111; 227/109; 29/432; 29/54; 29/798

(58) Field of Classification Search
USPC .............. 29/525.01, 798, 565, 432, 716, 823, 29/772, 50, 51, 52, 54; 227/7, 110, 111, 227/102, 2, 4, 100, 109, 117
See application file for complete search history.

(56) References Cited

U.S. PATENT DOCUMENTS

| | | | | | |
|---|---|---|---|---|---|
| 3,261,527 | A | * | 7/1966 | Sterner | 227/7 |
| 3,576,286 | A | * | 4/1971 | Bunch | 227/2 |
| 3,628,714 | A | * | 12/1971 | Offenwanger | 227/7 |
| 3,763,547 | A | * | 10/1973 | Blakeslee | 29/430 |
| 3,777,357 | A | * | 12/1973 | Whitney et al. | 29/429 |
| 3,817,438 | A | * | 6/1974 | Raab | 227/152 |
| 3,820,704 | A | | 6/1974 | Stanley | |
| 3,822,958 | A | * | 7/1974 | Lewis | 408/46 |
| 3,876,128 | A | | 4/1975 | Feren | |
| 3,984,040 | A | * | 10/1976 | Fry | 227/7 |
| 4,419,803 | A | * | 12/1983 | Thornton et al. | 29/428 |
| 4,467,951 | A | * | 8/1984 | Pagano | 227/48 |
| 4,732,307 | A | * | 3/1988 | Hubbard et al. | 227/7 |
| 4,793,540 | A | | 12/1988 | Mangan et al. | |
| 4,966,323 | A | * | 10/1990 | Speller et al. | 227/51 |
| 5,058,795 | A | * | 10/1991 | Tonus | 227/7 |
| 5,095,605 | A | * | 3/1992 | Tonus | 29/432 |
| 5,379,508 | A | * | 1/1995 | Givler et al. | 29/525.06 |
| 5,477,597 | A | * | 12/1995 | Catania et al. | 29/34 B |

(Continued)

FOREIGN PATENT DOCUMENTS

EP 1050392 A1 * 11/2000 ............... B27M 3/00

*Primary Examiner* — Essama Omgba
(74) *Attorney, Agent, or Firm* — Law Offices of Steven W. Weinrieb

(57) ABSTRACT

A two gun tool dolly which is capable of firing and inserting two, three or four nails into plate, header, or footer frame members at predetermined locations thereof so as to fixedly secure top and bottom plate, header, or footer members to stud frame members of a wall structure or wall panel.

22 Claims, 2 Drawing Sheets

(56) References Cited

U.S. PATENT DOCUMENTS

| | | | | |
|---|---|---|---|---|
| 6,266,871 | B1 * | 7/2001 | Edwards | 29/818 |
| 6,814,272 | B2 * | 11/2004 | Storti | 227/100 |
| 7,047,614 | B2 | 5/2006 | Scott et al. | |
| 7,228,997 | B1 * | 6/2007 | Thompson | 227/110 |
| 7,562,443 | B2 * | 7/2009 | Rowe | 29/798 |
| 7,954,681 | B2 * | 6/2011 | Smith et al. | 227/111 |
| 2003/0172524 | A1 * | 9/2003 | Glenn | 29/809 |
| 2003/0172615 | A1 * | 9/2003 | Glenn | 52/741.1 |
| 2004/0089695 | A1 * | 5/2004 | Svensson | 227/99 |

* cited by examiner

TWO GUN TOOL DOLLY FOR FIRING AND INSERTING THREE OR MORE NAILS INTO PLATE, HEADER, OR FOOTER FRAME MEMBERS BEING ATTACHED TO WALL STUD MEMBERS

CROSS-REFERENCE TO RELATED PATENT APPLICATIONS

This patent application is related to, based upon, and effectively a utility patent application conversion of U.S. Provisional Patent Application Ser. No. 60/960,526 which was filed on Oct. 2, 2007, the date benefits of which are hereby claimed.

FIELD OF THE INVENTION

The present invention relates generally to assembly apparatus, and more particularly to a new and improved two gun tool dolly which is uniquely structured, operated, and mounted so as to be capable of firing and inserting two, three, or more nails into plate, header, or footer frame members at predetermined locations thereof so as to fixedly secure such top and bottom plate, header, or footer members to laterally spaced 2×4 wall stud frame members of a wall structure or wall panel. More particularly, the two guns are mounted upon movable assemblies which not only permit the guns to be moved, for example, toward and away from the 2×4 wall stud frame members of the wall structure or wall panel, as well as the top or bottom plate, header, or footer members to be attached thereto, so as to in fact be capable of attaching a predetermined part of the top or bottom plate, header, or footer members to a particular wall stud frame members of the laterally separated 2×4 wall stud frame members of the wall panel or wall structure, but in addition, the guns are capable of being moved along the length of the top or bottom plate, header, or footer members so as to permit predetermined parts of the top or bottom plate, header, or footer members to be capable of being attached to the various laterally spaced 2×4 wall stud frame members of the wall structure or wall panel. Still further, the guns are capable of being moved vertically so as to in fact permit multiple nails to be fired and inserted into the top or bottom plate, header, or footer members to be attached to the various laterally spaced 2×4 wall stud frame members of the wall structure or wall panel.

BACKGROUND OF THE INVENTION

In connection with the fabrication of wall panels or wall structures, building codes, enacted within some regions of the country, or within various counties, sometimes require that fastening plate, header, or footer members be fixedly secured to the top and bottom regions of corresponding 2×4 or 2×6 stud frame members of the wall panels or wall structures by means of three or more nails. Sometimes two nails are acceptable if they are sufficiently large, however, three or four nails are usually required. Conventionally, however, automatic or semi-automatic apparatus does not exist which will in fact permit such assembly operations to be readily implemented.

A need therefore exists in the art for a new and improved two gun tool dolly which is uniquely structured and operated so as to be capable of firing and inserting two, three, or more nails into the plate, header, or footer members of the wall panels or wall structures at predetermined locations thereof so as to fixedly secure the top and bottom plate, header, or footer members to the 2×4 or 2×6 stud frame members of the wall panels or wall structures being fabricated.

SUMMARY OF THE INVENTION

The foregoing and other objectives are achieved in accordance with the teachings and principles of the present invention through the provision of a new and improved two-gun tool dolly which comprises a pair of nail guns which are mounted upon a support assembly within a vertically oriented array, that is, a first one of the pair of nail guns is disposed a predetermined distance above a second one of the pair of nail guns. The pair of nail guns are mounted upon support structure which is capable of movement, with respect to the wall panel or wall structure comprising the plurality of, for example, the 2×4 stud members and the plate, header, or footer members, along three mutually orthogonal axes such that the nail guns are able to be positioned at desired and required locations with respect to the plate, header, or footer members of the wall panel or wall structure which are adapted to be fixedly disposed upon a framing table, along with the plurality of 2×4 stud members, in order to fabricate a wall panel or wall structure. More particularly, the support structure comprises a carriage assembly which is movable in a first horizontal direction so as to permit the pair of nail guns to effectively be moved parallel to an end portion of the wall panel or wall structure whereby the pair of nail guns are able to successively fire and insert nails into the plate, header, or footer members so as to secure predetermined portions of the same into the plurality of 2×4 stud frame members which are spaced from each other by means of predetermined distances. A support arm is movably mounted upon the carriage assembly by means of a piston-cylinder assembly so as to permit the pair of nail guns to be moved in a second horizontal direction, perpendicular to the first horizontal direction, toward or away from the wall panel or wall structure, and lastly, the pair of nail guns are mounted upon carriage assemblies, which are mounted upon the support arm, so as to permit the pair of nail guns to be moved vertically between two or more defined positions.

In accordance with a first mode of operation, and when, for example, the pair of nail guns are being used to fire and insert two nails into a plate, header, or footer members of the wall panel or wall structure to be attached to a plurality of 2×4 stud members, the pair of nail guns are located at a first lowered one of two or more vertically spaced positions and are simultaneously fired so as to effectively insert nails into the upper and lower regions of the plate, header, or footer member of the wall panel or wall structure as well as into upper and lower regions of the particular 2×4 stud member. Subsequently, the pair of nail guns are moved to a second upper one of the two vertically spaced positions whereby only the lower one of the pair of nail guns is fired so as to effectively insert a third nail into a central portion of the plate, header, or footer member of the wall panel or wall structure as well as into a central portion of the 2×4 stud member to which the plate, header, or footer member of the wall panel or wall structure is to be attached, whereby, in effect, the third nail will be interposed between the first and second nails.

A somewhat similar firing mode of operation may be implemented in connection with the attachment of the upper or lower plate, header, or footer member of the wall panel or wall structure to the plurality of 2×6 stud members. More particularly, it is to be noted that while the upper nail gun is effectively attached to and moves along with the lower nail gun, the upper nail gun is also independently movable with respect to the lower nail gun. Accordingly, when it is desired to attach the upper or lower plate, header, or footer member of the wall panel or wall structure to the plurality of 2×6 stud members, the pair of nail guns are disposed at their normal lowermost position and fired so as to effectively insert nails into the lowermost and central portions of the upper or lower plate, header, or footer member of the wall panel or wall structure, as well as the lowermost and central portions of the plurality of 2×6 stud members. Subsequently, in order to fire and insert a third nail into the upper part of the upper or lower plate, header, or footer member of the wall panel or wall structure, as well as into the upper part of the particular 2×6 stud member, the lower gun is raised approximately one inch (1.00") which, in turn, raises the upper gun approximately one inches (1.00") since they are effectively connected together, and the upper gun is likewise raised one inch (1.00") however, only the upper gun is fired at this time such that the third nail is fired into the uppermost part of the upper or lower plate, header, or footer member of the wall panel or wall structure, as well as into the uppermost part of the particular 2×6 stud member.

Lastly, in order to fire and insert third and fourth nails into the central and uppermost parts of the upper or lower plate, header, or footer member of the wall panel or wall structure, as well as into the central and uppermost parts of the plurality of 2×6 stud members, the lower gun is raised approximately one inch (1.00") which, in turn, raises the upper gun approximately one inch (1.00") since they are effectively connected together, however, again, the upper gun is also raised independently of the lower gun an additional one inch (1.00"). Accordingly, when the lower gun is fired, it will insert a nail between the original first and second nails fired and inserted by means of the upper and lower guns when they were disposed at their original lowered positions, and then when the second upper gun is fired, it will insert a fourth nail above its originally fired second nail when it was fired at its original lowered position. As is therefore readily apparent, different modes of affixing upper or lower plate, header, or footer members of the wall panel or wall structure to the plurality of 2×4 or 2×6 stud members, either by means of two, three, or four nails, is possible by means of the two-gun tool dolly of the present invention.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DESCRIPTION OF THE ILLUSTRATED EMBODIMENTS

Figure 1:
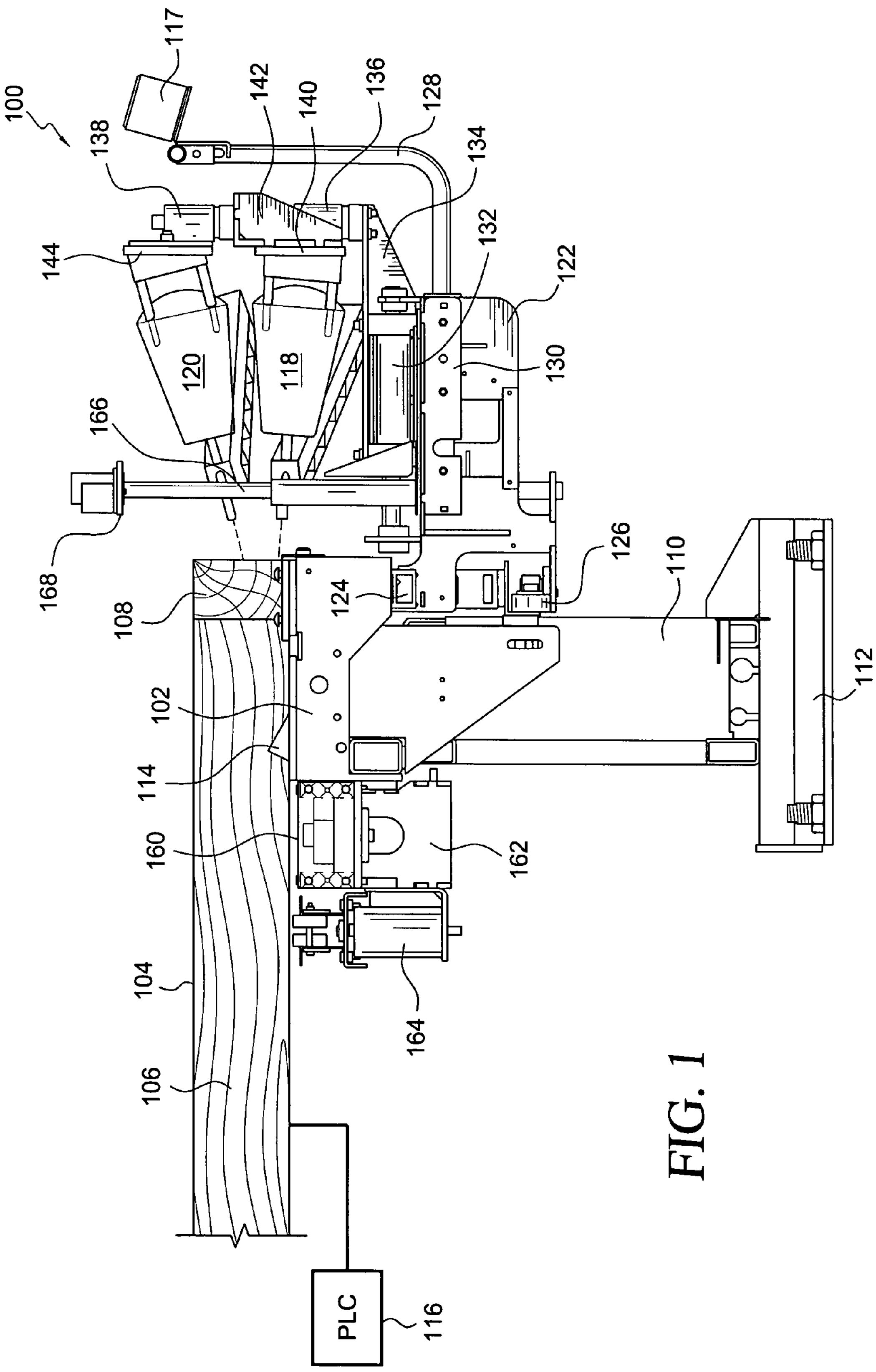
FIG. 1 is a side elevational view of a new and improved gun tool dolly constructed in accordance with the principles and teachings of the present invention and showing the various component parts thereof.

Referring now to the drawings, and more particularly to FIG. 1 thereof, a new and improved two gun tool dolly system, constructed in accordance with the principles and teachings of the present invention, and showing the component parts thereof, is illustrated and is generally indicated by the reference character 100. The two gun tool dolly system 100 is operatively associated with a framing table 102 upon the upper deck of which there is disposed a wall structure or wall panel 104 which comprises a plurality of laterally spaced 2×4 or 2×6 stud members 106 to which is adapted to be fixedly attached an upper or lower plate, header, or footer member 108 which, together with the plurality of 2×4 or 2×6 stud members, forms the wall structure or wall panel 104 to be fabricated. The upper deck of the framing table 102 is fixedly supported upon the upper end of a vertically oriented stanchion or support 110, and the stanchion or support 110 is, in turn, fixedly supported upon a foot or block member 112 which is supported upon, for example, the floor of the fabrication plant or facility. In addition, a plurality of stud locators 114, although only one is actually visible, are pivotally mounted at predeterminedly laterally spaced positions along the framing table 104 so as to effectively be disposed upon opposite sides of each one of the 2×4 or 2×6 studs members 106 so as to thereby indicate precisely where the 2×4 or 2×6 stud members are located. A programmable logic computer (PLC) 116 which, among other functions, serves to fire the first and second lower and upper nail guns 118,120, when the operator personnel transmits a signal to the programmable logic controller (PLC) 116 through means of a control panel 117 mounted upon one of the handlebars as will be described shortly.

More particularly, as can best be seen from FIG. 1, it is seen that a pair of first and second lower and upper nail guns 118,120 are mounted upon a carriage assembly 122 which is movably mounted upon the underside of the framing table 102 and upon an upstanding side of the stanchion or support 110 by means of suitable rollers 124,126 such that the carriage assembly 122 is movable in a direction into and out of the page and parallel to the length of the upper or lower plate, header, or footer member 108. The carriage assembly 122 has, in turn, fixedly mounted thereon a pair of laterally spaced operator-controlled handlebars 128 by means of suitable mounting brackets 130, only one of which is visible, and in this manner, the operator can effectively control the disposition of the carriage assembly 122, along with the first and second lower and upper nail guns 118,120, relative to the upper or lower plate, header, or footer member 108 and the plurality of laterally spaced 2×4 or 2×6 stud members 106 to which the upper or lower plate, header, or footer member 108 is adapted to be fixedly attached. The programmable logic controller (PLC) is operatively connected to the apparatus so as to receive signals from the operator control panel 117 when the operator has aligned the nailing guns 118,120 with a particular stud member into which one or more nails are to be driven. It is further seen that a piston-cylinder assembly 132 is fixedly mounted upon the carriage assembly 122 and that the extensible and retractable piston rod of the piston-cylinder assembly 132 is fixedly connected to a mounting bracket 134 upon which the first and second lower and upper nail guns 118,120 are actually mounted as will be more fully explained hereinafter. In this manner, as the piston rod of the piston-cylinder assembly 132 is extended or retracted, the first and second lower and upper nail guns 118,120 are actually permitted to move toward and away from the wall structure or wall panel 104 which comprises the plurality of laterally spaced 2×4 or 2×6 stud members 106 to which is adapted to be fixedly attached the upper or lower plate, header, or footer member 108 which, together with the plurality of 2×4 or 2×6 stud members, forms the wall structure or wall panel 104 to be fabricated.

Still yet further, it is seen that an additional dual piston-cylinder assembly 136,138 has its lowermost piston-cylinder assembly 136 not only attached at its lowermost end portion to the mounting bracket 134, but in addition, the first lower nail gun 118 is mounted upon a first vertically movable carriage or adaptor plate assembly 140 which, in turn, is mounted upon a mounting bracket 142 which is mounted upon the lowermost piston-cylinder assembly 136 so as to be operatively connected to the piston rod of the lowermost piston-cylinder assembly 136. The second upper nail gun 120 is similarly mounted upon a second vertically movable carriage or adaptor plate assembly 144 which is attached to or mounted upon the second uppermost piston-cylinder assembly 138, and the piston rod of the first lowermost piston-cylinder assembly 136 is also disposed opposite to and engaged with the extensible and retractable piston rod of the second uppermost piston-cylinder assembly 138. In this manner, when the lower-most piston-cylinder assembly 136 is extended so as to effectively raise or elevate the first lower nail gun 118, the second nail gun 120 will also be raised or elevated accordingly due to the operative connection established between the piston rod members of the first and second lower and upper piston-cylinder assemblies 136,138. However, due to the fact that the second upper nail gun 120 is also mounted upon its own carriage or adaptor plate assembly 144 and is operatively connected to the second upper piston-cylinder assembly 138, the second nail gun 120 can be raised or elevated independently of the first nail gun 118 as a result of the extension of the piston rod member of the second upper piston-cylinder assembly 138 which effectively causes the cylinder portion of the second upper piston-cylinder assembly 138 to be raised or elevated. As a result of the foregoing structure, it can also be readily appreciated that the lower and upper nail guns 118,120 are movable in accordance with three mutually orthogonal directions with respect to the framing table 102 and the wall structure or wall panel 104 mounted thereon.

Figure 2:
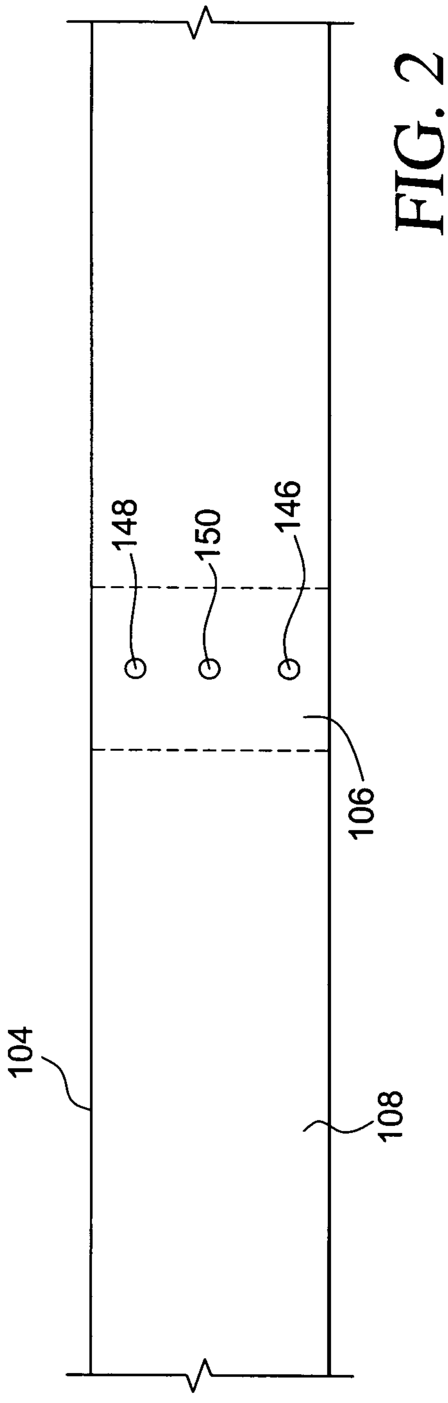
FIG. 2 is a schematic view showing the side face of a 2×4 plate, header, or footer member, with the stud frame member shown in phantom, into which three nails have been inserted in accordance with a first mode of operation of the pair of guns that are mounted upon the new and improved gun tool dolly illustrated within FIG. 1.

Having described substantially all of the operative components of the new and improved two gun tool dolly system, which has been constructed in accordance with the principles and teachings of the present invention, a brief description of the operation of the same in accordance with the different modes of operation will now be described. In accordance with a first mode of operation, and when, for example, the pair of nail guns 118,120 are being used to fire and insert two nails into a plate, header, or footer members 108 of the wall panel or wall structure 104 to be attached to a plurality of 2×4 stud members 106, the pair of nail guns 118,120 are located at their first lowered one of two or more vertically spaced positions, after being properly positioned by means of the piston cylinder assembly 132 and the handlebar-controlled carriage assembly 122 so as to properly align the nail guns with the particular 2×4 stud member 106 into which the nails are to be inserted. At this time, the nail guns 118,120 are simultaneously fired so as to effectively insert nails 146, 148 into the upper and lower regions of the plate, header, or footer member 108 of the wall panel or wall structure 104 as well as into upper and lower regions of the particular 2×4 stud member 106. Subsequently, the pair of nail guns 118,120 are moved to a second upper one of the two vertically spaced positions, through means of a distance of, for example, one inch (1.00") by activating the lowermost piston-cylinder assembly 136. At this point in time, only the lower one of the pair of nail guns 118 is fired so as to effectively insert a third nail 150 into a central portion of the plate, header, or footer member 108 of the wall panel or wall structure 104 as well as into a central portion of the 2×4 stud member 106 to which the plate, header, or footer member 108 of the wall panel or wall structure 104 is to be attached, whereby, in effect, the third nail 150 will be interposed between the first and second nails 146,148 as illustrated within FIG. 2.

Figure 3:
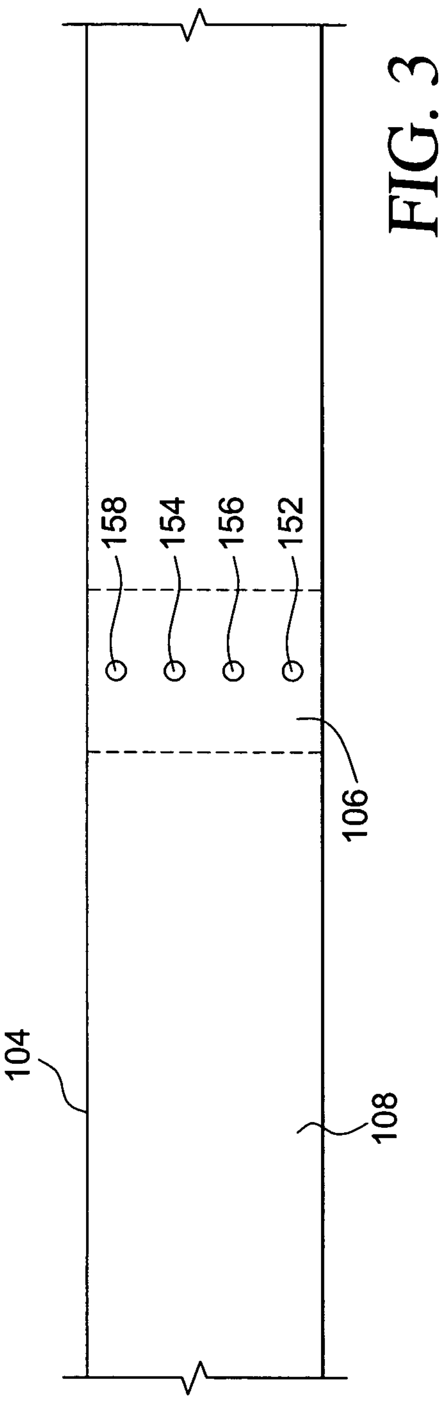
FIG. 3 is a schematic view showing the side face of a 2×6 plate, header, or footer into which four nails have been inserted in accordance with a second mode of operation of the pair of guns that are mounted upon the new and improved gun tool dolly illustrated within FIG. 1.

A somewhat similar firing mode of operation may be implemented in connection with the attachment of the upper or lower plate, header, or footer member 108 of the wall panel or wall structure 104 to the plurality of 2×6 stud members 106. More particularly, it is to be noted that while the upper nail gun 120 is effectively attached to and moves along with the lower nail gun 118 as a result of the aforenoted operative interconnection between the piston rods of the piston-rod assemblies 136,138, the upper nail gun 120 is also independently movable with respect to the lower nail gun 118 also as a result of the aforenoted operative interconnection between the piston rods of the piston-rod assemblies 136,138, that is, the cylinder portion of the upper piston-cylinder assembly 138 is independently movable with respect to the lower piston-cylinder assembly 136 when the piston rod of such upper piston-cylinder assembly 138 is extended. Accordingly, when it is desired to attach the upper or lower plate, header, or footer member 108 of the wall panel or wall structure 104 to the plurality of 2×6 stud members 106 by means of three nails, the pair of nail guns 118,120 are disposed at their normal lowermost position and fired so as to effectively insert nails 152, 154 into the lowermost and central portions of the upper or lower plate, header, or footer member 108 of the wall panel or wall structure 104, as well as the lowermost and central portions of the plurality of 2×6 stud members 106. Subsequently, in order to fire and insert a third nail into the upper part of the upper or lower plate, header, or footer member 108 of the wall structure or wall panel 104, as well as into the upper part of the particular 2×6 stud member 106, the lower gun is raised approximately one inch (1.00") which, in turn, raises the upper gun approximately one inch (1.00") since they are effectively connected together, and the upper gun is likewise raised an additional one inch (1.00"), however, only the upper gun is fired at this time such that the third nail 158 is fired into the uppermost part of the upper or lower plate, header, or footer member 108 of the wall panel or wall structure 104, as well as into the uppermost part of the particular 2×6 stud member 106 as illustrated in FIG. 3.

Lastly, in accordance with a final mode of operation, in order to fire and insert third and fourth nails into the central and uppermost parts of the upper or lower plate, header, or footer member 108 of the wall panel or wall structure 104, as well as into the central and uppermost parts of the plurality of 2×6 stud members 106, the lower gun 118 is raised approximately one inch (1.00") which, in turn, raises the upper gun 120 approximately one inch (1.00") since they are effectively connected together, however, again, the upper gun 120 is also raised independently of the lower gun an additional one inch (1.00") by extending its piston rod as has been noted hereinbefore. Accordingly, when the lower nail gun 118 is fired, it will insert a third nail 156 between the original first and second nails 152,154 fired and inserted by means of the lower and upper nail guns 118,120 when the lower and upper nail guns 118,120 were disposed at their original lowered positions, and then when the second upper nail gun 120 is fired, it will insert a fourth nail 158 above its originally fired second nail 154 when it was fired at its original lowered position. As is therefore readily apparent, different modes of affixing upper or lower plate, header, or footer members 108 of the wall panel or wall structure 104 to the plurality of 2×4 or 2×6 stud members 106, either by means of two, three, or four nails, is possible by means of the two-gun tool dolly 100 of the present invention. It is of course to be understood that in connection with any one of the aforenoted modes of operation, all movements of the various components of the two gun tool dolly 100, and the firing of the nail guns 118,120, are under the control of, for example, the operator-initiated, programmable logic controller (PLC) 116.

It is lastly noted that in addition to the plurality of stud locators 114, a plurality of laterally spaced light bars 160 may also be employed. Information obtained by the light bars 160 may be conveyed to the operator personnel so that the operator personnel knows where the stud members are located. The light bars 160 are mounted upon the framing table 102, and a support 162 is also mounted thereon for mounting a discharge conveyor 164 which is utilized to discharge the completed wall structure or wall panel 104. Still further, a two-sectioned upstanding clamping arm 166 is disposed upon the carriage assembly 122. The upper section of the clamping arm is vertically movable with respect to the lower section thereof, and the upper section of the clamping arm is provided with an arm member 168 which is rotatable with the upper section around the vertically extending longitudinal axis of the clamping arm 166 so as to be seated upon the upper surface portions of the upper or lower plate, header, or footer members 108 of the wall panel or wall structure 104 and the plurality of 2×4 or 2×6 stud members 106 so as to maintain the same properly seated upon the upper deck of the framing table 102.

Thus, it may be seen that in accordance with the teachings and principles of the present invention, there has been disclosed a new and improved two gun tool dolly which is uniquely structured and operated so as to be capable of firing and inserting three or more nails into plate, header, or footer frame members at predetermined locations thereof so as to fixedly secure the top and bottom plate, header, or footer members to stud frame members of the wall structure or wall panel.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A gun tool dolly comprising:

a pair of vertically spaced nail guns comprising a first vertically lower nail gun, and a second vertically upper nail gun;

a first actuator, upon which said first vertically movable lower nail gun is mounted, for moving said first vertically lower nail gun upwardly and downwardly between first and second upper and lower positions; and a second actuator, upon which said second vertically movable upper nail gun is mounted, operatively connected to said first actuator for moving said second vertically upper nail gun upwardly and downwardly between first and second upper and lower positions;

wherein, as a result of said pair of first and second actuators being operatively connected to each other, actuation of said first actuator causes movement of both of said first one of said first and second upper and lower vertically spaced nail guns, as well as corresponding movement of said second one of said first and second upper and lower vertically spaced nail guns together with said first one of said first and second upper and lower vertically spaced nail guns, however, only said second one of said first and second upper and lower vertically spaced nail guns is movable with respect to said first one of said upper and lower vertically spaced nail guns as a result of the actuation of said second actuator, whereby two, three, and four nails may be inserted into a structure, in a vertically oriented array, as a result of predetermined vertical movements and predetermined firing sequences of said pair of vertically spaced nail guns at said first lower and second upper vertically spaced positions.

2. The gun tool dolly as set forth in claim 1, wherein:

said pair of vertically spaced nail guns are movable along six degrees of freedom and along three mutually orthogonal axes.

3. The gun tool dolly as set forth in claim 2, wherein:

said pair of vertically spaced nail guns are movable along said three mutually orthogonal axes as a result of being mounted upon a carriage assembly so as to position said pair of vertically spaced nail guns at predetermined positions along the structure into which the nails are to be driven.

4. The gun tool dolly as set forth in claim 2, wherein:

said pair of vertically spaced nail guns are movable along said three mutually orthogonal axes as a result of being mounted upon a support mounted upon said carriage assembly for moving said pair of vertically spaced guns toward and away from the structure, into which the nails are to be driven, between inoperative non-firing modes and operative firing modes.

5. The gun tool dolly as set forth in claim 4, wherein:

said pair of vertically spaced nail guns are movable along said three mutually orthogonal axes by first piston-cylinder assemblies mounted upon said support for moving said pair of vertically spaced nail guns toward the structure into operative firing positions and away from the structure into inoperative non-firing positions.

6. The gun tool dolly as set forth in claim 4, wherein:

said pair of vertically spaced nail guns are movable along said three mutually orthogonal axes by second piston-cylinder assemblies mounted upon said support for moving said nail guns vertically between said first and second vertically spaced positions such that two, three, and four nails may be inserted into a structure as a result of the controlled vertical movement and firing of said pair of nail guns at said first and second vertically spaced positions.

7. The gun tool dolly as set forth in claim 6, wherein:

when two nails are to be inserted into a plate, header, or footer member of a wall panel or wall structure to be attached to a plurality of stud members, said pair of vertically spaced nail guns are located at said first vertically lower position and simultaneously fired so as to effectively insert nails into upper and lower regions of the plate, header, or footer member of the wall panel or wall structure as well as into upper and lower regions of the particular stud member.

8. The gun tool dolly as set forth in claim 6, wherein:

when three nails are to be inserted into a plate, header, or footer member of a wall panel or wall structure to be attached to a plurality of stud members, said pair of vertically spaced nail guns are located at said first lower position and simultaneously fired so as to effectively insert first and second nails into upper and lower regions of the plate, header, or footer member of the wall panel or wall structure as well as into upper and lower regions of the particular stud member, said first and second nail guns are then moved vertically upwardly a first predetermined distance to said second upper position, however, only said vertically lower nail gun of said pair of vertically spaced nail guns is fired so as to effectively insert a third nail into a substantially intermediate region of the plate, header, or footer member of the wall panel or wall structure, as well as into the particular stud member, such that a third nail is interposed between the first and second nails.

9. The gun tool dolly as set forth in claim 8, wherein:
said first predetermined distance that said first and second nail guns are moved vertically upwardly is approximately one inch (1.00").

10. The gun tool dolly as set forth in claim 6, wherein:
when three nails are to be inserted into a plate, header, or footer member of a wall panel or wall structure to be attached to a plurality of stud members, said pair of vertically spaced nail guns are located at said first lower position and simultaneously fired so as to effectively insert first and second nails into upper and lower regions of the plate, header, or footer member of the wall panel or wall structure as well as into upper and lower regions of the particular stud member, said first and second nail guns are then moved vertically upwardly first predetermined distances, however, only said second vertically upper nail gun is fired so as to effectively insert a third nail into an uppermost region of the plate, header, or footer member of the wall panel or wall structure, as well as into an uppermost region of the particular stud member, such that the third nail is disposed above the second nail originally fired by said second nail gun into the upper regions of the plate, header, or footer member of the wall panel or wall structure and the particular stud member.

11. The gun tool dolly as set forth in claim 10, wherein:
said first predetermined distance that said first and second nail guns are moved vertically upwardly is approximately one inch (1.00").

12. The gun tool dolly as set forth in claim 6, wherein:
when four nails are to be inserted into a plate, header, or footer member of a wall panel or wall structure to be attached to a plurality of stud members, said pair of nail guns are located at said first lower position and simultaneously fired so as to effectively insert first and second nails into upper and lower regions of the plate, header, or footer member of the wall panel or wall structure as well as into upper and lower regions of the particular stud member, said first and second nail guns are then moved vertically upwardly a first predetermined distance, said second nail gun is moved vertically upwardly a second predetermined distance which is substantially equal to said first predetermined distance, and said first and second nail guns are simultaneously fired so as to effectively insert a third nail into an uppermost region of the plate, header, or footer member of the wall panel or wall structure, as well as into an uppermost region of the particular stud member, such that the third nail is disposed above the second nail originally fired by said second nail gun into the upper regions of the plate, header, or footer member of the wall panel or wall structure and the particular stud member, and said fourth nail is interposed between the first and second nails.

13. The gun tool dolly as set forth in claim 12, wherein:
said first and second predetermined distances are approximately one inches (1.00").

14. The gun tool dolly as set forth in claim 6, wherein:
when four nails are to be inserted into a plate, header, or footer member of a wall panel or wall structure to be attached to a plurality of stud members, said pair of vertically spaced nail guns are located at said first lower position and simultaneously fired so as to effectively insert first and second nails into upper and lower regions of the plate, header, or footer member of the wall panel or wall structure as well as into upper and lower regions of the particular stud member, and said first and second vertically spaced nail guns are then moved vertically upwardly a predetermined distance and again simultaneously fired so as to effectively insert a third nail into an uppermost region of the plate, header, or footer member of the wall panel or wall structure, as well as into an uppermost region of the particular stud member, such that the third nail is disposed above the second nail originally fired by said second nail gun into the upper regions of the plate, header, or footer member of the wall panel or wall structure and the particular stud member, and the fourth nail is interposed between said first and second nails.

15. A method of inserting nails into a structure by a nail gun tool dolly, comprising the steps of:
providing a pair of vertically spaced nail guns comprising a first vertically lower nail gun and a second vertically upper nail gun;
providing a first actuator, upon which said first vertically movable lower nail gun is mounted, for moving said first vertically lower nail gun upwardly and downwardly between first and second upper and lower positions;
providing a second actuator, upon which said second vertically movable upper nail is mounted, engaged with and operatively connected to said first actuator for moving said second vertically upper nail gun upwardly and downwardly between first and second upper and lower positions; and
actuating said first actuator so as to cause movement of both of said first one of said first and second upper and lower vertically spaced nail guns, and corresponding movement of said second one of said first and second upper and lower vertically spaced nail guns together with said first one of said first and second upper and lower vertically spaced nail guns, however, only said second one of said first and second upper and lower vertically spaced nail guns is movable with respect to said first one of said upper and lower vertically spaced nail guns as a result of the actuation of said second actuator, whereby two, three, and four nails may be inserted into a structure, in a vertically oriented array, as a result of predetermined vertical movements and predetermined firing sequences of said pair of vertically spaced nail guns at said first lower and second upper vertically spaced positions.

16. The method as set forth in claim 15, further comprising the steps of:
when two nails are to be inserted into a plate, header, or footer member of a wall panel or wall structure to be attached to a plurality of stud members, said pair of vertically spaced nail guns are located at said first vertically lowered position and simultaneously fired so as to effectively insert nails into upper and lower regions of the plate, header, or footer member of the wall panel or wall structure as well as into upper and lower regions of the particular stud member.

17. The method as set forth in claim 15, wherein:

when three nails are to be inserted into a plate, header, or footer member of a wall panel or wall structure to be attached to a plurality of stud members, said pair of vertically spaced nail guns are located at said first lower position and simultaneously fired so as to effectively insert nails into upper and lower regions of the plate, header, or footer member of the wall panel or wall structure as well as into upper and lower regions of the particular stud member, said first and second nail guns are then moved vertically upwardly a first predetermined distance to said second upper position, however, only said vertically lower nail gun of said pair of vertically spaced nail guns is fired so as to effectively insert a third nail into a substantially intermediate region of the plate, header, or footer member of the wall panel or wall structure, as well as into the particular stud member, such that a third nail is interposed between the first and second nails.

18. The method as set forth in claim 17, wherein:

said first predetermined distance that said first and second nail guns are moved vertically is approximately one inch (1.00").

19. The method as set forth in claim 15, wherein:

when three nails are to be inserted into a plate, header, or footer member of a wall panel or wall structure to be attached to a plurality of stud members, said pair of vertically spaced nail guns are located at said first lower position and simultaneously fired so as to effectively insert first and second nails into upper and lower regions of the plate, header, or footer member of the wall panel or wall structure as well as into upper and lower regions of the particular stud member, said first and second nail guns are then moved vertically upwardly first predetermined distances, however, only said second vertically upper nail gun is fired so as to effectively insert a third nail into an uppermost region of the plate, header, or footer member of the wall panel or wall structure, as well as into an uppermost region of the particular stud member, such that the third nail is disposed above said second nail originally fired by said second nail gun into the upper regions of the plate, header, or footer member of the wall panel or wall structure and the particular stud member.

20. The method as set forth in claim 19, wherein:

said first predetermined distances that said first and second vertically spaced nail guns are moved vertically upwardly are approximately one inch (1.00").

21. The method as set forth in claim 15, wherein:

when four nails are to be inserted into a plate, header, or footer members of a wall panel or wall structure to be attached to a plurality of stud members, said pair of vertically spaced nail guns are located at said first lower position and simultaneously fired so as to effectively insert first and second nails into upper and lower regions of the plate, header, or footer member of the wall panel or wall structure as well as into upper and lower regions of the particular stud member, said first and second vertically spaced nail guns are then moved vertically upwardly a first predetermined distance, said second nail gun is moved vertically upwardly a second predetermined distance which is substantially equal to said first predetermined distance, and said first and second vertically movable nail guns are simultaneously fired so as to effectively insert a third nail into an uppermost region of the plate, header, or footer member of the wall panel or wall structure, as well as into an uppermost region of the particular stud member, such that the third nail is disposed above the second nail originally fired by said second nail gun into the upper regions of the plate, header, or footer member of the wall panel or wall structure and the particular stud member, and the fourth nail is interposed between the first and second nails.

22. The method as set forth in claim 15, wherein:

when four nails are to be inserted into a plate, header, or footer member of a wall panel or wall structure to be attached to a plurality of stud members, said pair of vertically spaced nail guns are located at said first lower position and simultaneously fired so as to effectively insert first and second nails into upper and lower regions of the plate, header, or footer member of the wall panel or wall structure as well as into upper and lower regions of the particular stud member, and said first and second vertically spaced nail guns are then moved vertically upwardly a predetermined distance and again simultaneously fired so as to effectively insert a third nail into an uppermost region of the plate, header, or footer member of the wall panel or wall structure, as well as into an uppermost region of the particular stud member, such that the third nail is disposed above the second nail originally fired by said second nail gun into the upper regions of the plate, header, or footer member of the wall panel or wall structure and the particular stud member, and the fourth nail is interposed between said first and second nails.

* * * * *